US008749144B2

(12) United States Patent
Han et al.

(10) Patent No.: US 8,749,144 B2
(45) Date of Patent: Jun. 10, 2014

(54) METHOD FOR DRIVING A LIGHT SOURCE, DRIVING APPARATUS FOR DRIVING THE LIGHT SOURCE AND LIQUID CRYSTAL DISPLAY APPARATUS HAVING THE DRIVING APPARATUS

(75) Inventors: Song-Yi Han, Cheonan-si (KR);
Sung-Kyu Park, Masan-si (KR);
Yun-Gun Lee, Cheonan-si (KR)

(73) Assignees: Samsung Display Co., Ltd. (KR);
Korea Taiyo Yuden Co., Ltd. (KR)

( * ) Notice: Subject to any disclaimer, the term of this patent is extended or adjusted under 35 U.S.C. 154(b) by 265 days.

(21) Appl. No.: 12/573,073

(22) Filed: Oct. 2, 2009

(65) Prior Publication Data

US 2010/0181917 A1   Jul. 22, 2010

(30) Foreign Application Priority Data

Jan. 20, 2009   (KR) ........................ 10-2009-0004386

(51) Int. Cl.
*H05B 37/00* (2006.01)

(52) U.S. Cl.
USPC ........... 315/119; 315/121; 315/291; 315/294; 315/297

(58) Field of Classification Search
USPC .................................. 315/119, 291; 345/102
See application file for complete search history.

(56) References Cited

U.S. PATENT DOCUMENTS

| 6,359,391 | B1 * | 3/2002 | Li .................................. 315/291 |
| 2004/0004596 | A1 * | 1/2004 | Kang et al. ..................... 345/102 |
| 2004/0119679 | A1 * | 6/2004 | Garcia et al. ................... 345/102 |
| 2006/0038592 | A1 * | 2/2006 | Inoue et al. .................... 327/108 |
| 2008/0036393 | A1 * | 2/2008 | Ushijima et al. ............... 315/277 |

FOREIGN PATENT DOCUMENTS

| JP | 2008-017636 |   | 1/2008 |   |
| JP | 2008017636 | * | 1/2008 | .............. H02H 9/02 |
| KR | 100142718 B1 |   | 4/1998 |   |
| KR | 1020000039009 A |   | 7/2000 |   |
| KR | 1020000044338 A |   | 7/2000 |   |

* cited by examiner

*Primary Examiner* — Douglas W Owens
*Assistant Examiner* — Jonathan Cooper
(74) *Attorney, Agent, or Firm* — Innovation Counsel LLP (57) ABSTRACT

According to one or more embodiments, an inverter provides a light source with an input voltage. A protection circuit shuts down the inverter based on an overvoltage protection level that is detected based on the input voltage. A protection circuit control part shuts down the operation of the protection circuit during a predetermined interval. Abnormal operation of the protection circuit caused by a high voltage provided when the light source is turned on may be prevented. Therefore, a turn-on defect of the light source may be prevented.

14 Claims, 9 Drawing Sheets

METHOD FOR DRIVING A LIGHT SOURCE, DRIVING APPARATUS FOR DRIVING THE LIGHT SOURCE AND LIQUID CRYSTAL DISPLAY APPARATUS HAVING THE DRIVING APPARATUS

PRIORITY STATEMENT

This application claims priority under 35 U.S.C. §119 to Korean Patent Application No. 2009-4386, filed on Jan. 20, 2009 in the Korean Intellectual Property Office (KIPO), the contents of which are herein incorporated by reference in their entirety.

BACKGROUND

1. Technical Field

Example embodiments of the present invention generally relate to a method for driving a light source, a driving apparatus for driving the light source and a liquid crystal display (LCD) apparatus having the driving apparatus. More particularly, example embodiments of the present invention relate to a method for driving a light source for preventing a turn-on defect of the light source, a driving apparatus for driving the light source, and an LCD apparatus having the driving apparatus.

2. Description of the Related Art

Light generated from a light source is transformed into planar light having uniform brightness, and the planar light is provided to a liquid crystal display (LCD) panel.

Examples of the light source include a cold cathode fluorescent lamp (CCFL), an external electrode fluorescent lamp (EEFL), a light-emitting diode (LED), etc.

A driving voltage is provided to the light source so that the light source generates the light. An element for providing the driving voltage is a driver (or inverter) in a backlight unit. The driver applies a high voltage to the light source so that the light source generates light.

For example, the backlight unit includes the light source generating the light and the driver that converts a direct current (DC) voltage of an input voltage to an alternating current (AC) voltage and boosts the voltage to provide the light source with the voltage. The driver provides a high voltage for turning on the light source in an initial stage, and controls a current flowing through the light source to maintain uniform brightness of the light source.

However, an open lamp may be detected by the high voltage for turning on the light source in the initial stage. Therefore, a protection circuit may unnecessarily operate when a turn-on defect has not occurred.

SUMMARY

Example embodiments of the present invention provide a method of driving a light source capable of preventing abnormal operation of a protection circuit caused by a high voltage for turning on the light source in an initial stage.

Example embodiments of the present invention provide an apparatus for performing the above-mentioned method.

Example embodiments of the present invention provide a liquid crystal display (LCD) apparatus having the above-mentioned apparatus.

According to one embodiment of the present invention, there is provided a method for driving a light source. In the method, an input voltage is applied to the light source. An overvoltage protection level may be detected by distributing the input voltage. The input voltage applied to the light source may be blocked based on the overvoltage protection level. An operation of blocking the input voltage applied to the light source may be stopped during a predetermined interval.

In an example embodiment of the present invention, the input voltage may be distributed through a capacitance method.

In an example embodiment of the present invention, blocking the input voltage may include generating a holding signal having a lower level than a first reference level during the predetermined interval, generating the holding signal having a higher level than the first reference level except during the predetermined interval, comparing the holding signal with the first reference level, generating a protection circuit control signal having a high level when the holding signal is higher than the first reference level, and generating the protection circuit control signal having a low level when the holding signal is lower than or equal to the first reference level. Blocking the input voltage may be performed based on the protection circuit control signal.

In an example embodiment of the present invention, the predetermined interval may be about 200 μm to about 600 μm and be substantially the same as an interval in which the light source is turned on.

According to another embodiment of the present invention, a driving apparatus for driving a light source includes an inverter, a protection circuit and a protection circuit control part. The inverter provides the light source with an input voltage. The protection circuit may shut down the inverter based on an overvoltage protection level that is detected based on the input voltage. The protection circuit control part may shut down the operation of the protection circuit during a predetermined interval.

In an example embodiment of the present invention, the driving apparatus may further include a printed circuit board (PCB), and a pattern capacitor. The pattern capacitor may be defined by patterns formed on an upper surface and a lower surface of the PCB. The protection circuit detects the overvoltage protection level by using the pattern capacitor and provides the protection circuit control part with the detected overvoltage protection level.

In an example embodiment of the present invention, the protection circuit may be mounted on the PCB. The PCB may further include a plurality of balance capacitors restricting the input voltage provided from the inverter to each of the light sources to uniformly maintain a balance of electric currents applied to the light sources.

In an example embodiment of the present invention, a pulse width of the input voltage may be modulated. The predetermined interval may be about 200 μm to about 600 μm, and be substantially the same as an interval in which the light source is turned on.

In an example embodiment of the present invention, the protection circuit control part may include a holding part generating a holding signal having a lower level than a first reference level during the predetermined interval and a higher level than the first reference level except during the predetermined interval, and a comparing part comparing the holding signal with the first reference level in order to generate a protection circuit control signal having a low level during the predetermined interval and a high level except during the predetermined interval. The protection circuit may operate based on the protection circuit control signal.

In an example embodiment of the present invention, the PCB may further include a plurality of balance inductors controlling the input voltage provided from the inverter to each of the light sources to uniformly maintain a balance of electric currents applied to the light sources.

According to still another embodiment of the present invention, an LCD apparatus includes an LCD panel, a light source and a driving apparatus driving the light source. The light source provides the LCD panel with light. The driving apparatus includes an inverter, a protection circuit and a protection circuit control part. The inverter provides the light source with an input voltage. The protection circuit shuts down the inverter based on an overvoltage protection level that is detected based on the input voltage. The protection circuit control part may stop the operation of the protection circuit during a predetermined interval.

In an example embodiment of the present invention, the protection circuit control part may include a holding part and a comparing part. The holding part generates a holding signal having a lower level than a first reference level during the predetermined interval and a higher level than the first reference level except during the predetermined interval. The comparing part compares the holding signal with the first reference level to generate a protection circuit control signal having a low level during the predetermined interval and a high level except during the predetermined interval.

In an example embodiment of the present invention, the PCB may include a plurality of balance inductors controlling the input voltage provided from the inverter to each of the light sources to uniformly maintain a balance of electric currents applied to the light sources.

In an example embodiment of the present invention, the LCD apparatus may further include a feedback circuit part generating a feedback signal which controls a voltage level of the input voltage in accordance with whether the light source is normally turned on.

In an example embodiment of the present invention, the protection circuit may shut down the inverter when the overvoltage protection level is higher than a second reference level.

In an example embodiment of the present invention, the light source may be one of a plurality of light-emitting diodes (LEDs) and at least one cold cathode fluorescent lamp (CCFL).

According to one or more embodiments of the present invention, a protection circuit blocking a current applied to a light source may be shut down during a predetermined interval, even though a voltage corresponding to the predetermined interval is higher than a voltage corresponding to an interval in which light sources are turned on. Thus, the operation of the protection circuit may be prevented when the light source is not faulty.

BRIEF DESCRIPTION OF THE DRAWINGS

The above and other features and advantages of the present disclosure will become more apparent by describing in detail example embodiments thereof with reference to the accompanying drawings, in which.

DETAILED DESCRIPTION

The present disclosure is described more fully hereinafter with reference to the accompanying drawings, in which example embodiments of the present invention are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Embodiment 1

Figure 1:
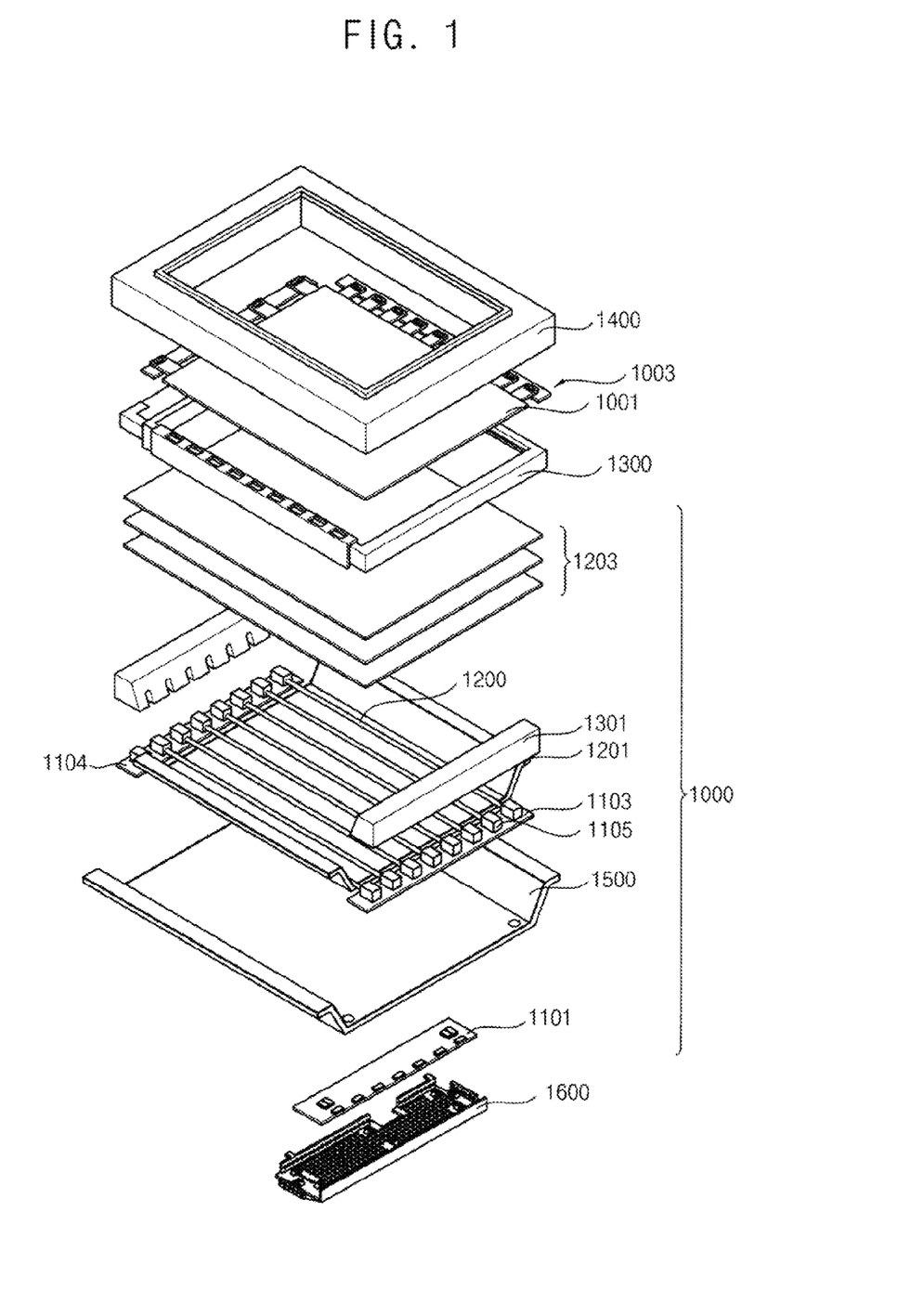
FIG. 1 is an exploded perspective view illustrating a liquid crystal display (LCD) device according to Embodiment 1 of the present invention.
Figure 2:
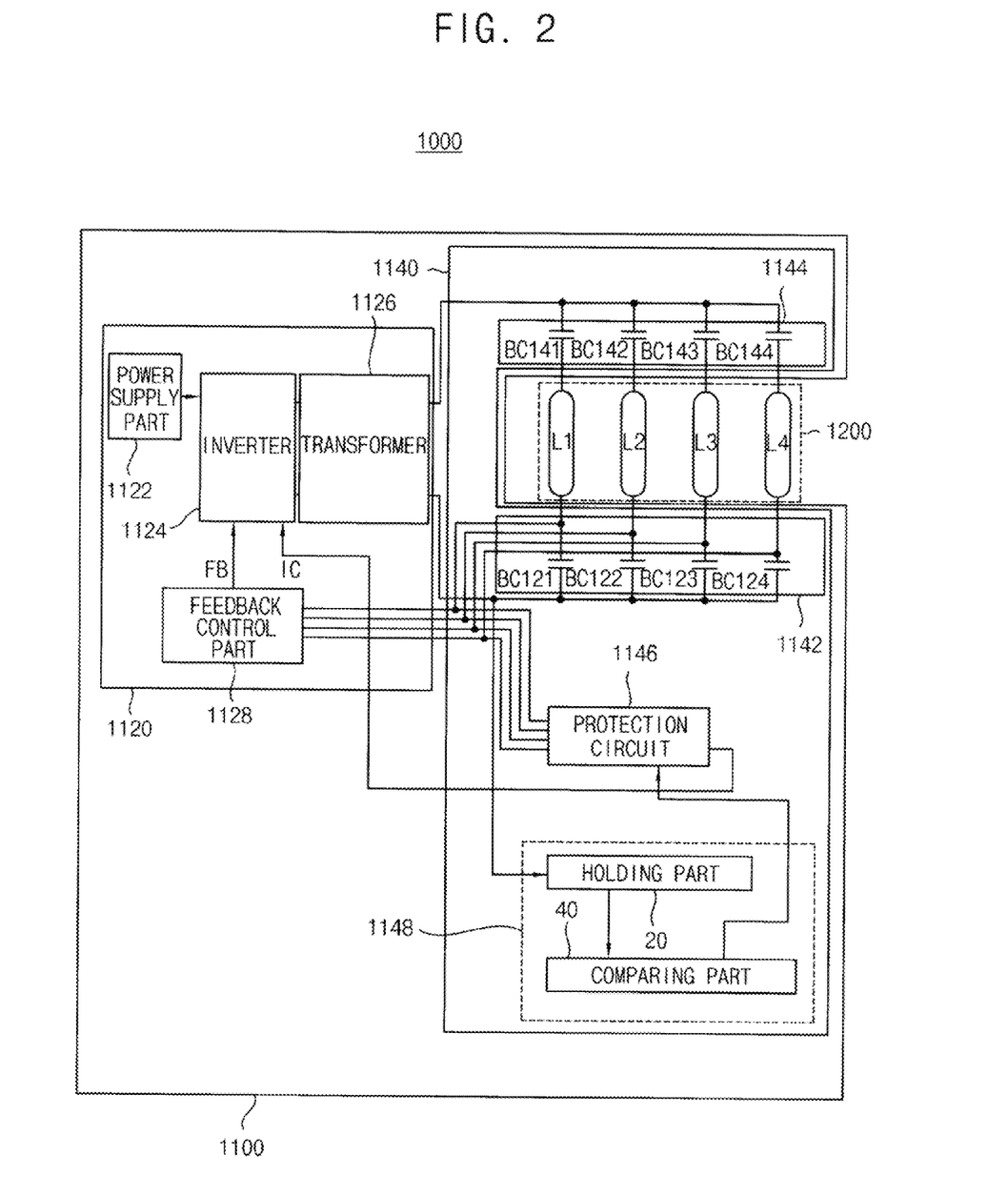
FIG. 2 is a block diagram illustrating a backlight unit of the LCD apparatus as illustrated in FIG. 1 according to an embodiment.

FIG. 1 is an exploded perspective view illustrating a liquid crystal display (LCD) device according to Embodiment 1 of the present invention. FIG. 2 is a block diagram illustrating a backlight unit of the LCD apparatus as illustrated in FIG. 1 according to an embodiment.

Referring to FIGS. 1 and 2, the LCD apparatus according to Embodiment 1 includes an LCD panel 1001, a backlight unit 1000, a main support 1300, a top case 1400, a bottom cover 1500 and a cover shield 1600.

The LCD panel 1001 includes an upper substrate, a lower substrate and a liquid crystal layer interposed therebetween. The upper and lower substrates face each other and are separated by a predetermined distance from each other. The lower substrate may include a thin-film transistor (TFT) that is a kind of a switching element. The upper substrate may include a color filter. The LCD panel 1001 displays an image by an operation of turning on/off the TFT. The LCD panel 1001 is connected to a printed circuit board (PCB) 1003 that provides the LCD panel 1001 with a scanning signal and an image signal.

The backlight unit 1000 may be disposed at a rear side of the LCD panel 1001 to provide the backlight unit 1000 with light. The backlight unit 1000 includes a light source part 1200, a reflective sheet 1201, a plurality of optical sheets 1203, a first balance PCB 1103, a second balance PCB 1104 and an inverter PCB 1101.

The light source part 1200 includes a plurality of light sources arranged on the bottom cover 1500 in parallel. The reflective sheet 1201 is disposed between the light source part 1200 and the bottom cover 1500. In FIG. 1, a cold cathode fluorescent lamp (CCFL) may be used as the light source according to an embodiment.

Alternatively, a plurality of light-emitting diodes (LEDs) may be used as the light source. A side support 1301 may cover both ends of the light source part 1200. The plurality of optical sheets 1203 is disposed over the light source part 1200.

In this case, the light source part 1200 is connected to the first balance PCB 1103 and the second balance PCB 1104. The first balance PCB 1103 includes a first capacitor balance circuit 1142 for distributing an electric current to the light source part 1200 in parallel, and the second balance PCB 1104 includes a second capacitor balance circuit 1144 for distributing an electric current to the light source part 1200 in parallel. The first and second balance PCBs 1103 and 1104 may be arranged substantially perpendicular to a longitudinal direction of the light sources to connect the light sources in parallel.

For example, both ends of the light source part 1200 may be inserted into a plurality of light source sockets 1105, and the light source sockets 1105 may be soldered on the first and second balance PCBs 1103 and 1104, so that the light source part 1200 is electrically connected to the first and second balance PCBs 1103 and 1104. The first and second balance PCBs 1103 and 1104 are connected to the light source sockets 1105 to provide the light source part 1200 with a high alternating current (AC) voltage provided from the inverter PCB 1101.

In addition, the light source sockets 1105 soldered on the first and second balance PCBs 1103 and 1104 may be mounted on both ends of the bottom cover 1500 to support the light source part 1200.

In this case, the first capacitor balance circuit 1142, the second capacitor balance circuit 1144, a protection circuit 1146 and a protection circuit control part 1148 may be mounted on the first and second balance PCBs 1103 and 1104.

The first and second capacitor balance circuits 1142 and 1144 include a plurality of balance capacitors. The balance capacitors, the protection circuit 1146 and the protection circuit control part 1148 may be formed on the first and second balance PCBs 1103 and 1104. For example, patterns may be formed on an upper surface and a lower surface of the first and second balance PCBs 1103 and 1104, and a pattern capacitor is defined by the patterns.

The first and second balance PCBs 1103 and 1104 are disposed at the outside of the reflective sheet 1201 and on a side of the bottom cover 1500. The side support 1301 is combined with the bottom cover 1500 to entirely cover the first and second balance PCBs 1103 and 1104.

The top case 1400 covers an edge of the LCD panel 1001 and a side of the main support 1300. The top case 1400 supports and protects the edge of the LCD panel 1001 and the side of the main support 1300.

The bottom cover 1500 covers a lower portion of the main support 1300 to protect elements of the LCD apparatus. The bottom cover 1500 may be combined or fixed with the main support 1300 and the top case 1400 to form a module.

The inverter PCB 1101 may be disposed under the bottom cover 1500. The inverter PCB 1101 provides the light source part 1200 with electric power.

The cover shield 1600 covers the inverter PCB 1101. Accordingly, the bottom cover 1500 and the cover shield 1600 may envelop the inverter PCB 1101 to protect the inverter PCB 1101 from external impacts. The bottom cover 1500 and the cover shield 1600 may comprise a metal to shield against electromagnetic waves generated from the inverter PCB 1101.

An inverter 1124 may be mounted on the inverter PCB 1101. The inverter 1124 may be disposed toward the cover shield 1600 or a rear surface of the bottom cover 1500. The inverter PCB 1101 may be combined or fixed with the cover shield 1600.

The inverter PCB 1101 converts electric power provided from a power supply part 1122 into direct current (DC) electric power, to provide the light source part 1200 with the DC electric power.

As described above, the inverter PCB 1101 includes the inverter 1124. In Embodiment 1, the number of inverters 1124 may be smaller than the number of light sources of the light source part 1200. The LCD apparatus according to Embodiment 1 of the present invention separately includes the first and second balance PCBs 1103 and 1104 including the first and second capacitor balance circuits 1142 and 1144, respectively, which is different from a conventional LCD apparatus. The first and second capacitor balance circuits 1142 and 1144 divide the electric power provided from the inverter 1124 in parallel, and provide the light source part 1200 with the electric power in parallel. Accordingly, an additional plurality of wires for connecting the light source part 1200 to the inverter 1124 may not be necessary, and the light source part 1200 is connected to the first and second balance PCBs 1103 and 1104. For example, one inverter 1124 or a smaller number of inverters 1124 than the number of the light sources of the light source part 1200 may be connected to the first and second balance PCBs 1103 and 1104 through a connector (not shown).

Therefore, the light sources of the light source part 1200 do not directly receive the driving electric power through corresponding wires (not shown), but receive electric currents substantially equally distributed in parallel by the first and second capacitor balance circuits 1142 and 1144.

In addition, the first and second balance PCBs 1103 and 1104 may be mounted in a vacant space of the side support 1301, and the side support 1301 including the first and second balance PCBs 1103 and 1104 may be mounted in the bottom cover 1500, so that a reduced space of the LCD apparatus may be effectively utilized to make the LCD apparatus slimmer.

Referring back to FIGS. 1 and 2, the LCD apparatus according to Embodiment 1 of the present invention includes a light source driving apparatus 1100 and the light source part 1200.

The light source driving apparatus 1100 includes a power part 1120 and a protection part 1140.

For example, the light source part 1200 may include first, second, third and fourth light sources L1, L2, L3 and L4.

The power part 1120 includes a power supply part 1122, an inverter 1124, a transformer 1126 and a feedback control part 1128. The power part 1120 may be mounted on the inverter PCB 1101.

The power supply part 1122 provides the inverter 1124 with driving electric power. For example, the power supply part 1122 may include a switched-mode power supply (SMPS) that converts electric power provided from the power supply part 1122 into electric power suitable for the inverter 1124.

The inverter 1124 changes the DC driving electric power into an AC input voltage Vin.

The transformer 1126 boosts up the voltage level of the AC input voltage Vin, and provides the light source part 1200 with the boosted input voltage Vin.

The feedback control part 1128 detects whether the light source part 1200 is turned on normally or not. When the light source part 1200 is turned on normally, the feedback control part 1128 provides the inverter 1124 with a feedback signal FB. Alternatively, when the light source part 1200 is not turned on normally, the feedback control part 1128 does not provide the feedback signal FB to the inverter 1124, and the inverter 1124 increases the voltage level of the input voltage Vin that is to be applied to the light source part 1200 to turn on the light source part 1200.

The protection part 1140 includes a first capacitor balance circuit 1142, a second capacitor balance circuit 1144, a protection circuit 1146 and a protection circuit control part 1148.

The first capacitor balance circuit 1142 includes first, second, third and fourth balance capacitors BC121, BC122, BC123 and BC124. The number of the balance capacitors may be determined to correspond to the number of the light sources of the light source part 1200.

The first to fourth balance capacitors BC121, BC122, BC123 and BC124 may be mounted on the first balance PCB 1103.

The first to fourth balance capacitors BC121, BC122, BC123 and BC124 may be connected to first electrodes of the first to fourth light sources L1, L2, L3 and L4. The first to fourth balance capacitors BC121, BC122, BC123 and BC124 are disposed between the power part 1120 and the first to fourth light sources L1, L2, L3 and L4 to control the load properties of the first to fourth light sources L1, L2, L3 and L4 to avoid being changed by circumstances such as temperature, and to maintain a current balance so that uniform currents may flow through the first to fourth light sources L1, L2, L3 and L4. The protection circuit 1146 is disposed between the first capacitor balance circuit 1142 and the first to fourth light sources L1, L2, L3 and L4.

The second capacitor balance circuit 1144 includes fifth, sixth, seventh and eighth balance capacitors BC141, BC142, BC143 and BC144. The number of the balance capacitors may be determined to correspond to the number of the light sources of the light source part 1200.

The fifth to eighth balance capacitors BC141, BC142, BC143 and BC144 may be mounted on the second balance PCB 1104.

The fifth to eighth balance capacitors BC141, BC142, BC143 and BC144 may be second electrodes of the first to fourth light sources L1, L2, L3 and L4. The fifth to eighth balance capacitors BC141, BC142, BC143 and BC144 are disposed between the power part 1120 and the first to fourth light sources L1, L2, L3 and L4 to control the load properties of the first to fourth light sources L1, L2, L3 and L4 to avoid being changed by circumstances such as temperature, and to maintain a current balance so that uniform currents may flow through the first to fourth light sources L1, L2, L3 and L4. In the embodiment of FIG. 2, the protection circuit 1146 is disposed between the first capacitor balance circuit 1142 and the first to fourth light sources L1, L2, L3 and L4, but alternatively, the protection circuit 1146 may be disposed between the second capacitor balance circuit 1144 and the first to fourth light sources L1, L2, L3 and L4.

The protection circuit 1146 detects an overvoltage protection level OVP based on the output of the first to fourth light sources L1, L2, L3 and L4. The overvoltage protection level OVP is an electrical potential that is increased when the input voltage Vin is increased further than necessary. The overvoltage protection level OVP may function as an indicator for detecting a fault of the light sources. The protection circuit 1146 shuts down the inverter 1124 so that the inverter 1124 does not apply electric power to the light sources by outputting an inverter control signal IC when defects of the light sources are detected.

The inverter control signal IC in a high state represents that the first to fourth light sources L1, L2, L3 and L4 are operated normally, and thus the inverter 1124 provides the light source part 1200 with the input voltage Vin.

The inverter control signal IC in a low state represents that the first to fourth light sources L1, L2, L3 and L4 are operated abnormally. For example, the low state of the inverter control signal IC represents that the first to fourth light sources L1, L2, L3 and L4 have defects, and thus the inverter 1124 does not further provide the input voltage Vin to the light source part 1200.

Accordingly, when the first to fourth light sources L1, L2, L3 and L4 have defects, the protection circuit 1146 may prevent the input voltage Vin from continuously increasing.

The protection circuit control part 1148 includes a holding part 20 and a comparing part 40.

The holding part 20 outputs a holding signal HS stopping a blocking operation of the input voltage Vin provided to the first to fourth light sources L1, L2, L3 and L4 based on the input voltage Vin during a predetermined interval.

For example, the holding part 20 outputs the holding signal HS having a low level during a turn-on interval of the first to fourth light sources L1, L2, L3 and L4 in which the light sources are turned on.

The comparing part 40 provides the protection circuit 1146 with a protection circuit control signal PC. The protection circuit control signal PC has a high level after the light source is turned on and the protection circuit control signal PC has a low level during the predetermined interval.

When the protection circuit control signal PC is in a high state, the protection circuit 1146 is in operation. In contrast, when the protection circuit control signal PC is in a low state, the protection circuit 1146 does not operate.

Therefore, the protection circuit control signal PC may have a low level during the predetermined interval by the protection circuit control part 1148. Thus, the protection circuit 1146 may not operate.

Figure 3:
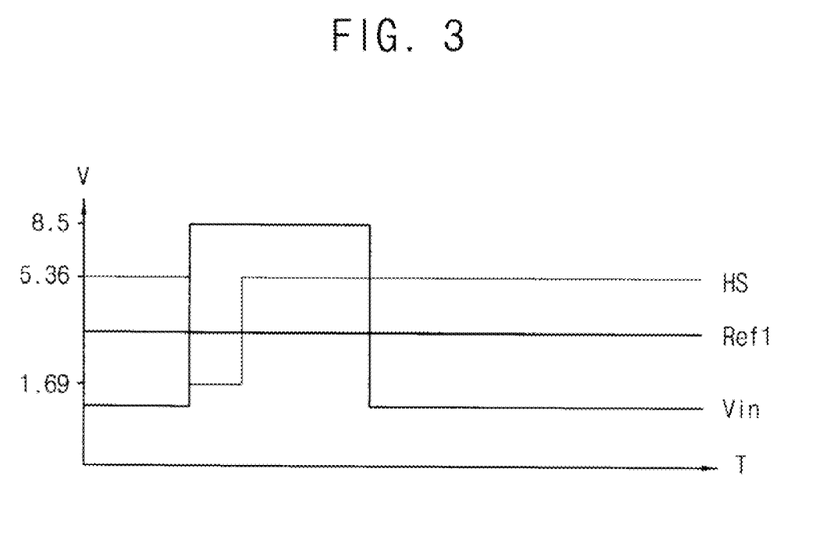
FIG. 3 is a waveform diagram illustrating a relationship between an input voltage applied to a light source and a holding signal generated by a holding part in FIG. 2.

FIG. 3 is a waveform diagram illustrating a relationship between an input voltage applied to a light source and a holding signal generated by a holding part in FIG. 2.

Referring to FIGS. 2 and 3, the holding signal HS may vary from about 5.36 V to about 1.69 V during the predetermined interval when the input voltage Vin is applied to the first to fourth light sources L1, L2, L3 and L4.

Voltages provided to the light sources during the predetermined interval are relatively higher than voltages provided to the light sources after the light sources are turned on. Thus, the overvoltage protection level OVP may determine the light sources to be faulty even though the light sources are normal.

Therefore, the holding part 20 generates the holding signal HS lower than a first reference level Ref1 during the turn-on interval in order to prevent errors as described. Here, the first reference level Ref 1 may be between about 5.36 V and about 1.69 V.

The comparing part 40 compares the holding signal HS with the first reference level Ref1 and outputs the protection circuit control signal PC in a low state during the predetermined interval so that the protection circuit 1146 does not operate. For example, the comparing part 40 outputs the protection circuit control signal PC in a high state when the holding signal HS is higher than the first reference level Ref1 and in a low state when the holding signal HS is lower than or equal to the first reference level Ref1.

Figure 4:
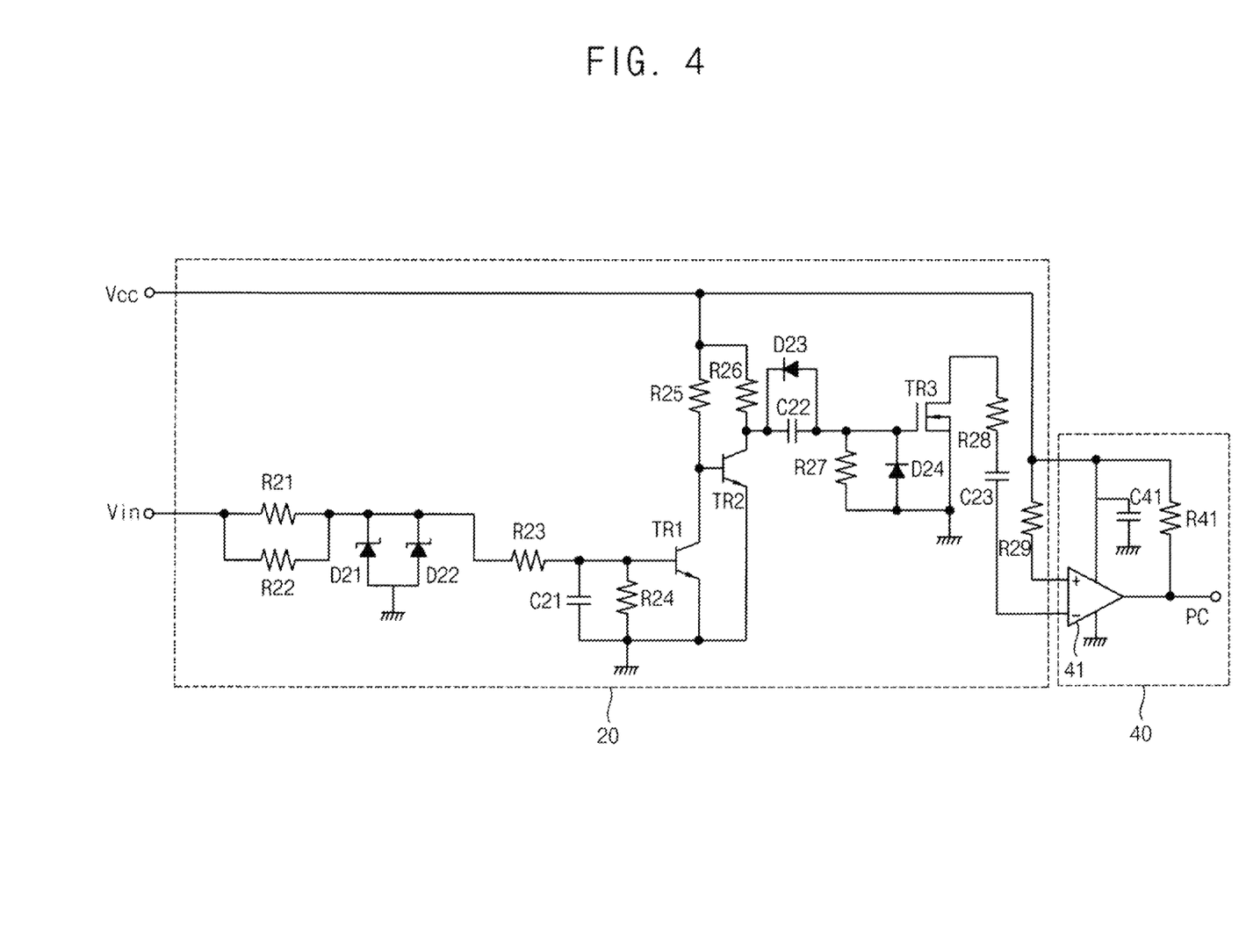
FIG. 4 is a circuit diagram illustrating a protection circuit control part of a light source driving apparatus in FIG. 2 according to an embodiment.

FIG. 4 is a circuit diagram illustrating a protection circuit control part of a light source driving apparatus in FIG. 2 according to an embodiment.

Referring to FIGS. 2 to 4, the holding part 20 receives the input voltage Vin and a power voltage Vcc. A first resistance R21 and a second resistance R22 are connected in parallel. The first and second resistances R21 and R22 have first ends receiving the input voltage Vin and second ends connected to first ends of a first Zener diode D21 and a second Zener diode D22 which are connected in parallel. Second ends of the first and second Zener diodes D21 and D22 are grounded.

In this case, the first and second resistances R21 and R22 distribute a voltage higher than a designated voltage so that the first ends of first and second Zener diodes D21 and D22 do not receive the voltage higher than the designated voltage.

The first ends of first and second Zener diodes D21 and D22 are connected to a first end of a third resistance R23. A second end of the third resistance R23 is connected to first ends of a first capacitor C21 and a fourth resistance R24 that are connected in parallel. The second end of the third resistance R23 is connected to a control terminal of a first switching element TR1.

A collector terminal of the first switching element TR1 is connected to a control terminal of a second switching element TR2 and the power voltage Vcc through a fifth resistance R25. A collector terminal of the second switching element TR2 is connected to the power voltage Vcc through a sixth resistance R26.

Emitter terminals of the first and second switching elements TR1 and TR2 are grounded.

The collector terminal of the second switching element TR2 is connected to first ends of a second capacitor C22 and a first diode D23 that are connected in parallel. Second ends of the second capacitor C22 and the first diode D23 are connected to a control terminal of a third switching element TR3.

A seventh resistance R27 and a second diode D24 are connected in parallel between a source terminal of the third switching element TR3 and second ends of the second capacitor C22 and the first diode D23. Additionally, a source terminal of the third switching element TR3 is grounded.

A drain terminal of the third switching resistance TR3, an eighth resistance R28, a third capacitor C23 and a negative terminal of a comparator 41 are serially connected. The comparator 41 is in the comparing part 40.

A positive terminal of the comparator 41 receives the power voltage Vcc through a ninth resistance R29. The negative terminal of the comparator 41 receives the first reference level Ref 1 as designated.

Therefore, the first switching element TR1 is turned on, the control terminal of the second switching element TR2 is grounded and the control terminal of the third switching element TR3 receives the power voltage Vcc when the input voltage Vin is in a high state.

Accordingly, the positive terminal of the comparator 41 receives the holding signal HS in a low state. The holding signal HS may be about 1.69 V.

A level of the holding signal HS and duration of the predetermined interval may be variable according to the second capacitor C22 and the seventh resistance R27.

For example, when a multiplication between a capacitance of the second capacitor C22 and a value of the seventh resistance R27 is higher, the duration of the predetermined interval may be longer and the level of the holding signal HS may be higher.

Figure 5:
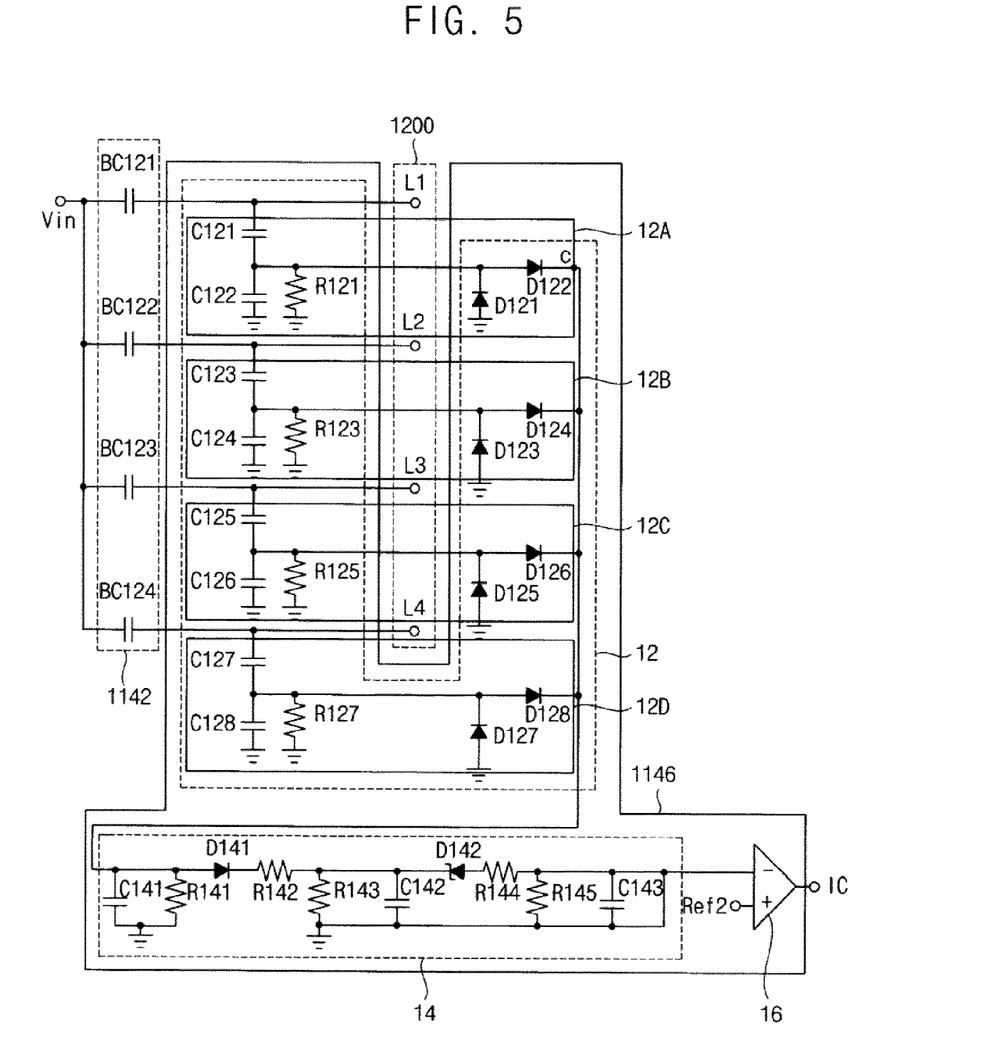
FIG. 5 is a circuit diagram illustrating the light source and a protection part of the backlight unit in FIG. 2 according to an embodiment.

FIG. 5 is a circuit diagram illustrating the light source and a protection part of the backlight unit in FIG. 2 according to an embodiment.

Referring to FIGS. 2 and 5, the protection part 1140 includes a first capacitor balance circuit 1142 and a protection circuit 1146.

The first capacitor balance circuit 1142 includes the first to fourth balance capacitors BC121, BC122, BC123 and BC124. First terminals of the first to fourth balance capacitors BC121, BC122, BC123 and BC124 receive the input voltage Vin, and second terminals of the first to fourth balance capacitors BC121, BC122, BC123 and BC124 are connected to the first electrodes of the first to fourth light sources L1, L2, L3 and L4. The first to fourth balance capacitors BC121, BC122, BC123 and BC124 control the load properties of the first to fourth light sources L1, L2, L3 and L4 to avoid being changed by circumstances such as temperature, and maintain a current balance so that uniform currents may flow through the first to fourth light sources L1, L2, L3 and L4.

The protection circuit 1146 includes a current detection part 12 and a smoothing circuit part 14.

The current detection part 12 includes a first current detection part 12A, a second current detection part 12B, a third current detection part 12C and a fourth current detection part 12D.

The first current detection part 12A includes a first capacitor C121, a second capacitor C122, a first resistor R121, a first diode D121 and a second diode D122. The first capacitor C121 and the second capacitor C122 are connected to each other in series, and are connected to a second terminal of the first balance capacitor BC121 in parallel. A first terminal of the first resistor R121 and an anode of the first diode D121 are connected to a first terminal of the second capacitor C122 in parallel. The input voltage Vin is distributed by the first capacitor C121, the second capacitor C122 and the first resistor R121. The first capacitor C121 may be a pattern capacitor that is defined by a pattern formed on an upper surface and a lower surface of the first balance PCB 1103. A second terminal of the second capacitor C122, a second terminal of the first resistor R121 and a cathode of the first diode D121 are electrically shorted. The anode of the first diode D121 is connected to a cathode of the second diode D122, and an anode of the second diode D122 is connected to a common node C. Accordingly, the distributed input voltage Vin is rectified by the first diode D121 and the second diode D122.

The second current detection part 12B includes a third capacitor C123, a fourth capacitor C124, a second resistor R123, a third diode D123 and a fourth diode D124. The third capacitor C123 and the fourth capacitor C124 are connected to each other in series, and are connected to a second terminal of the second balance capacitor BC122 in parallel. A first terminal of the second resistor R123 and an anode of the third diode D123 are connected to a first terminal of the fourth capacitor C124 in parallel. The input voltage Vin is distributed by the third capacitor C123, the fourth capacitor C124 and the second resistor R123. The third capacitor C123 may be a pattern capacitor that is defined by a pattern formed on an upper surface and a lower surface of the first balance PCB 1103.

A second terminal of the fourth capacitor C124, a second terminal of the second resistor R123 and a cathode of the third diode D123 are electrically shorted. The anode of the third diode D123 is connected to a cathode of the fourth diode D124, and an anode of the fourth diode D124 is connected to the common node C. Accordingly, the distributed input voltage Vin is rectified by the third diode D123 and the fourth diode D124.

The third current detection part 12C includes a fifth capacitor C125, a sixth capacitor C126, a third resistor R125, a fifth diode D125 and a sixth diode D126. The fifth capacitor C125 and the sixth capacitor C126 are connected to each other in series, and are connected to a second terminal of the third balance capacitor BC123 in parallel. A first terminal of the third resistor R125 and an anode of the fifth diode D125 are connected to a first terminal of the sixth capacitor C126 in parallel. The input voltage Vin is distributed by the fifth capacitor C125, the sixth capacitor C126 and the third resistor R125. The fifth capacitor C125 may be a pattern capacitor that is defined by a pattern formed on an upper surface and a lower surface of the first balance PCB 1103.

A second terminal of the sixth capacitor C126, a second terminal of the third resistor R125 and a cathode of the fifth diode D125 are electrically shorted. The anode of the fifth diode D125 is connected to a cathode of the sixth diode D126, and an anode of the sixth diode D126 is connected to the common node C. Accordingly, the distributed input voltage Vin is rectified by the fifth diode D125 and the sixth diode D126.

The fourth current detection part 12D includes a seventh capacitor C127, an eighth capacitor C128, a fourth resistor R127, a seventh diode D127 and an eighth diode D128. The seventh capacitor C127 and the eighth capacitor C128 are connected to each other in series, and are connected to a second terminal of the fourth balance capacitor BC124 in parallel. A first terminal of the fourth resistor R127 and an anode of the seventh diode D127 are connected to a first terminal of the eighth capacitor C128 in parallel. The input voltage Vin is distributed by the seventh capacitor C127, the eighth capacitor C128 and the fourth resistor R127. The seventh capacitor C127 may be a pattern capacitor that is defined by a pattern formed on an upper surface and a lower surface of the first balance PCB 1103.

A second terminal of the eighth capacitor C128, a second terminal of the fourth resistor R127 and a cathode of the seventh diode D127 are electrically shorted. The anode of the seventh diode D127 is connected to a cathode of the eighth diode D128, and an anode of the eighth diode D128 is connected to the common node C. Accordingly, the distributed input voltage Vin is rectified by the seventh diode D127 and the eighth diode D128.

The smoothing circuit part 14 includes ninth to eleventh capacitors C141, C142 and C143, fifth to ninth resistors R141, R142, R143 and R144, a ninth diode D141 and a first Zener diode D142.

A first terminal of the ninth capacitor C141 and a first terminal of the fifth resistor R141 are connected to the common node C in parallel. A second terminal of the ninth capacitor C141 and a second terminal of the fifth resistor R141 are electrically shorted.

The ninth diode D141 and the sixth resistor R142 are connected to the common node C in series. A cathode of the ninth diode D141 is connected to the common node C, and an anode of the ninth diode D141 is connected to a first terminal of the sixth resistor R142.

A first terminal of the tenth capacitor C142 and a first terminal of the seventh resistor R143 are connected to a second terminal of the sixth resistor R142 in parallel. A second terminal of the tenth capacitor C142 and a second terminal of the seventh resistor R143 are electrically shorted.

The first Zener diode D142 and the eighth resistor R144 are connected to the second terminal of the sixth resistor R142 in series. An anode of the first Zener diode D142 is connected to the second terminal of the sixth resistor R142, and a cathode of the first Zener diode D142 is connected to a first terminal of the eighth resistor R144.

A first terminal of the eleventh capacitor C143 and a first terminal of the ninth resistor R145 are connected to a second terminal of the eighth resistor R144 in parallel. A second terminal of the eleventh capacitor C143 and a second terminal of the ninth resistor R145 are electrically shorted.

The rectified input voltage Vin is smoothed by the ninth to eleventh capacitors C141, C142 and C143, the fifth to ninth resistors R141, R142, R143 and R144, the ninth diode D141 and the first Zener diode D142 that the smoothing circuit part 14 includes. Accordingly, the overvoltage protection level OVP that is a DC voltage is outputted from the first terminals of the eleventh capacitor C143 and the ninth resistor R145.

The protection circuit 1146 includes a comparator 16. A negative terminal of the comparator 16 receives the overvoltage protection level OVP that is an output of the smoothing circuit part 14, and a positive terminal of the comparator 16 receives the second reference level Ref2 as designated.

The comparator 16 compares the overvoltage protection level OVP with the second reference level Ref2, and outputs the inverter control signal IC. When the overvoltage protection level OVP is lower than or equal to the second reference level Ref2, the comparator 16 outputs the inverter control signal IC having a high level. When the overvoltage protection level OVP is higher than the second reference level Ref2, the comparator 16 outputs an inverter control signal IC having a low level.

For example, the high level of the inverter control signal IC represents that the first to fourth light sources L1, L2, L3 and L4 are operated normally, and thus the inverter 1124 provides the light source part 1200 with the input voltage Vin.

However, the low level of the inverter control signal IC represents that the first to fourth light sources L1, L2, L3 and L4 are operated abnormally. For example, the low state of the inverter control signal IC represents that a portion of the first to fourth light sources L1, L2, L3 and L4 is faulty, and thus the inverter 1124 does not further provide the input voltage Vin to the light source part 1200.

Accordingly, when a portion of the first to fourth light sources L1, L2, L3 and L4 is faulty, the protection circuit 1146 may prevent the input voltage Vin from continuously increasing.

Figure 6:
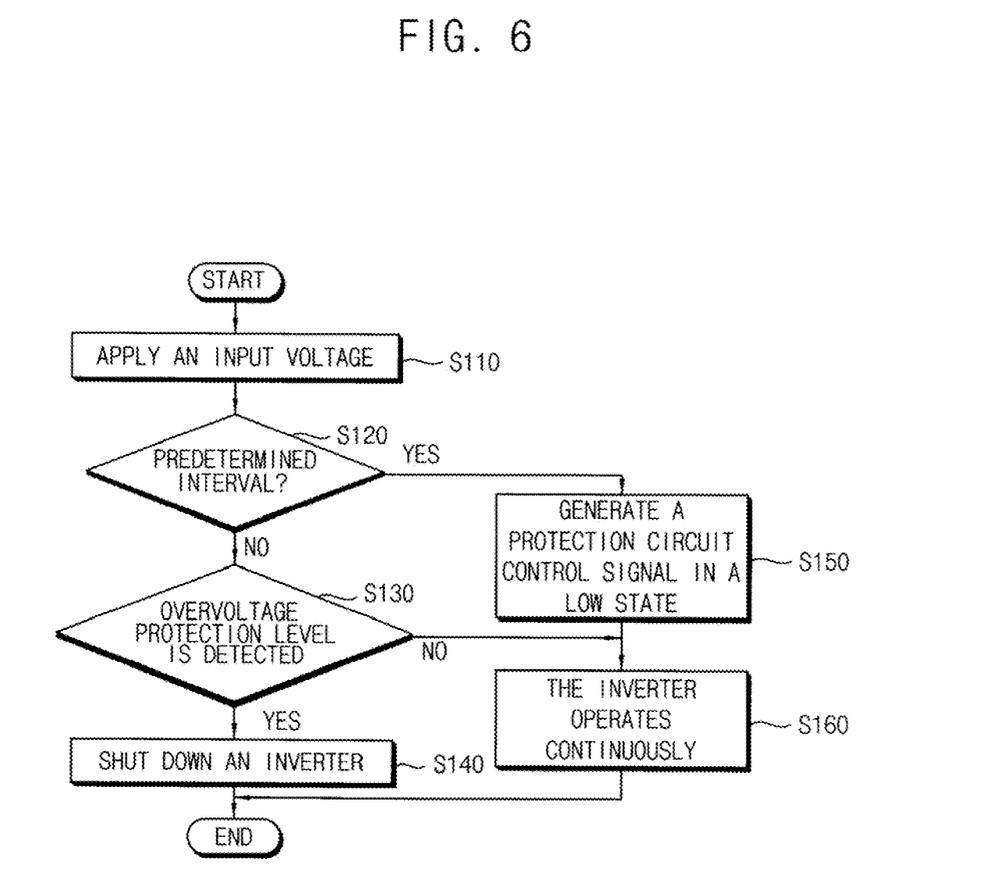
FIG. 6 is a flowchart illustrating a method of driving the light source in FIG. 2 according to an embodiment.

FIG. 6 is a flowchart illustrating a method of driving the light source in FIG. 2 according to an embodiment.

Referring to FIGS. 2 and 6, when the operation of the backlight unit 1000 starts, the inverter 1124 applies the input voltage Vin to the light source part 1200 (block S110).

Then, it is checked whether or not the input voltage Vin is applied to the light source part 1200 in the predetermined interval (block S120).

When the input voltage Vin is provided in another interval, it is checked whether or not the overvoltage protection level OVP is detected (block S130). When the overvoltage protection level OVP is detected, the protection circuit 1146 shuts down the inverter 1124 based on the overvoltage protection level OVP (block S140). When the overvoltage protection level OVP is not detected, the inverter 1124 operates continuously (block S160).

When the input voltage Vin is provided in the predetermined interval, the protection circuit control part 1148 generates the protection circuit control signal PC in a low state (block S150) so that the inverter 1124 operates continuously (block S160).

The input voltage may be applied to the LCD apparatus as a pulse width modulated signal by using a local dimming method, in which the light source part is divided into a plurality of luminous blocks based on an image displayed by the LCD panel 1001 and controls brightness separately in each of the luminous blocks.

The pulse width modulated signal corresponding to the predetermined interval may be higher than that corresponding to an interval in which the light sources are turned on. In this case, the protection circuit 1146 according to Embodiment 1 may stop the operation of the protection circuit control part 1148 during the predetermined interval.

Embodiment 2

Figure 7:
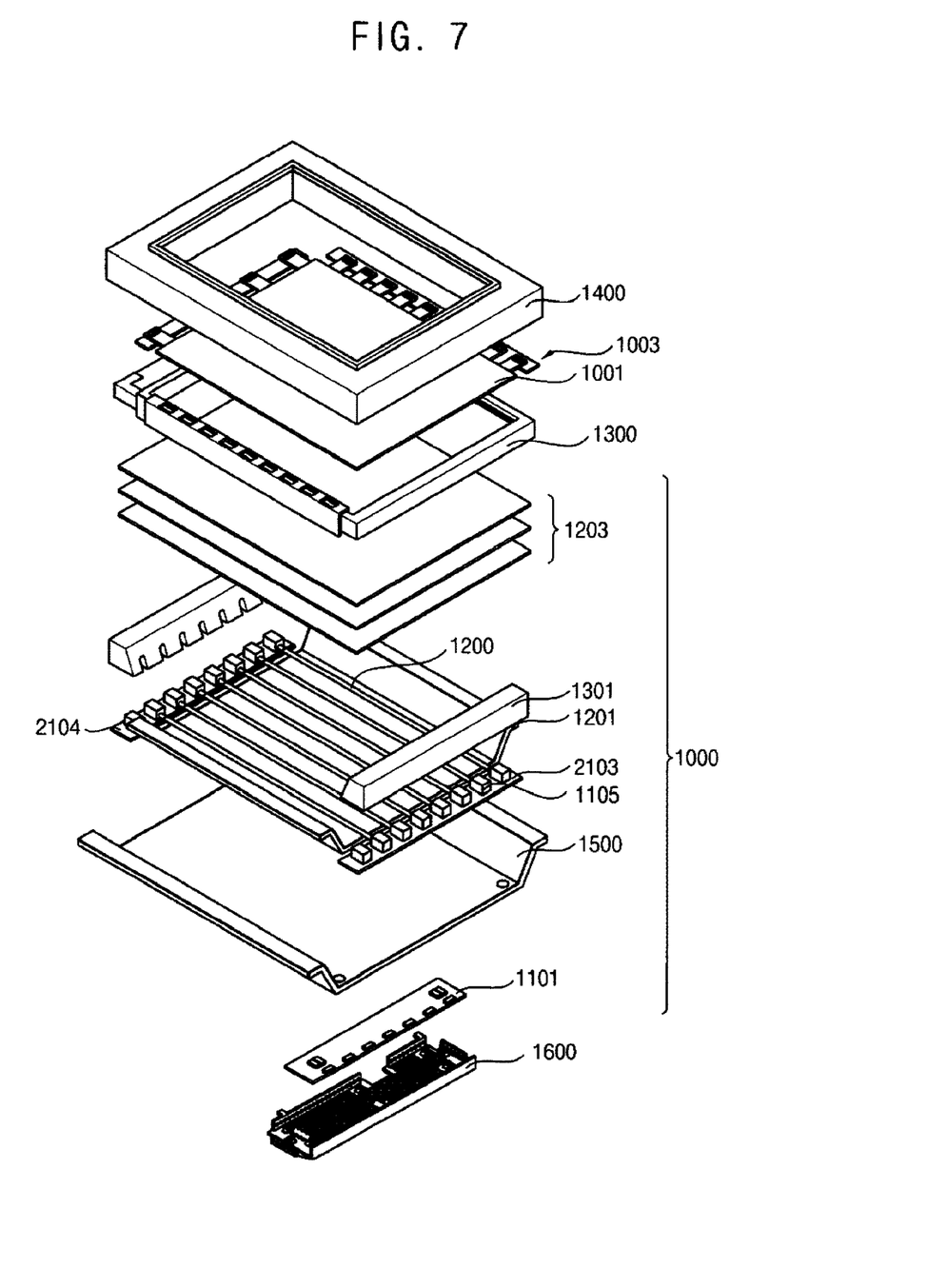
FIG. 7 is an exploded perspective view schematically illustrating an LCD device according to Embodiment 2 of the present invention.
Figure 8:
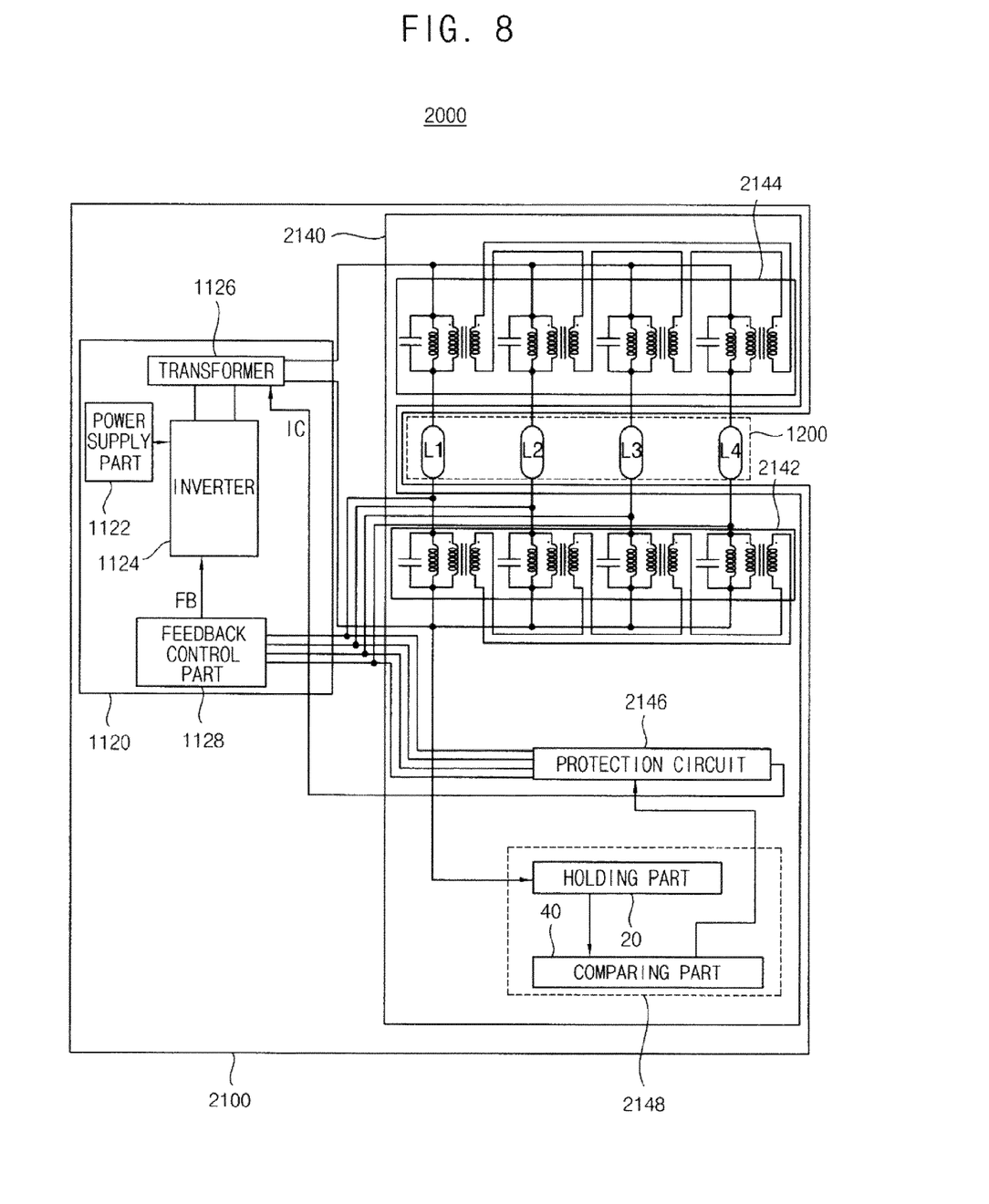
FIG. 8 is a block diagram illustrating a backlight unit of the LCD apparatus as illustrated in FIG. 7 according to an embodiment.

FIG. 7 is an exploded perspective view schematically illustrating an LCD device according to Embodiment 2 of the present invention. FIG. 8 is a block diagram illustrating a backlight unit of the LCD apparatus as illustrated in FIG. 7 according to an embodiment.

The LCD apparatus including a backlight unit described with reference to the embodiment of FIG. 7 may be substantially the same as the LCD apparatus described with reference to the embodiment of FIG. 1 except that a first transformer balance circuit 2142, a second transformer balance circuit 2144, a protection circuit 2146 and a protection circuit control part 2148 are mounted in a first balance PCB 2103 and a second balance PCB 2104. Therefore, the same reference numbers are used for the same or similar elements, and any further descriptions concerning the same or similar elements as those shown in FIG. 1 will be omitted.

In addition, the backlight unit described with reference to the embodiment of FIG. 8 may be substantially the same as the backlight unit described with reference to the embodiment of FIG. 2 except for the first transformer balance circuit 2142, the second transformer balance circuit 2144, the protection circuit 2146 and the protection circuit control part 2148. Therefore, the same reference numbers are used for the same or similar elements, and any further descriptions concerning the same or similar elements as those shown in FIG. 2 will be omitted.

Referring to FIGS. 7 and 8, the light source part 1200 is connected to the first balance PCB 2103 and the second balance PCB 2104. The first balance PCB 2103 includes a first transformer balance circuit 2142 for distributing an electric current to the light source part 1200 in parallel, and the second balance PCB 2104 includes a second transformer balance circuit 2144 for distributing an electric current to the light source part 1200 in parallel. The first and second balance PCBs 2103 and 2104 may be arranged substantially perpendicular to a longitudinal direction of the light sources to connect the light sources in parallel.

For example, both ends of the light source part 1200 are inserted into a plurality of light source sockets 1105, and the light source sockets 1105 are soldered on the first and second balance PCBs 2103 and 2104, so that the light source part 1200 is electrically connected to the first and second balance PCBs 2103 and 2104. The first and second balance PCBs 2103 and 2104 are connected to the light source sockets 1105 to provide the light source part 1200 with a high AC voltage provided from the inverter PCB 1101.

In addition, the plurality of light source sockets 1105 soldered on the first and second balance PCBs 2103 and 2104 is mounted on both ends of the bottom cover 1500, and supports the light source part 1200.

In this case, the protection circuit 2146, the protection circuit control part 2148, the first transformer balance circuit 2142 and the second transformer balance circuit 2144 may be mounted in the first and second balance PCBs 2103 and 2104.

The first and second transformer balance circuits 2142 and 2144 include a plurality of balance inductors. The balance inductors, the protection circuit 2146 and the protection circuit control part 2148 may be formed on the first and second balance PCBs 2103 and 2104.

The first and second balance PCBs 2103 and 2104 may be disposed at the outside of the reflective sheet 1201 and on a side of the bottom cover 1500. The side support 1301 is combined with the bottom cover 1500 to entirely cover the first and second balance PCBs 2103 and 2104.

The inverter PCB 1101 includes the inverter 1124. In Embodiment 2, the number of the inverters 1124 may be smaller than the number of the light sources of the light source part 1200. The LCD apparatus according to Embodiment 2 of the present invention separately includes the first and second balance PCBs 2103 and 2104 including the first and second transformer balance circuits 2142 and 2144, respectively, which is different from a conventional LCD apparatus. The first and second transformer balance circuits 2142 and 2144 divide the electric power provided from the inverter 1124 in parallel, and provide the light source part 1200 with the electric power in parallel. Accordingly, an additional plurality of wires for connecting the light source part 1200 to the inverter 1124 may not be necessary, and the light source part 1200 is connected to the first and second balance PCBs 2103 and 2104. For example, one inverter 1124 or a number of inverters 1124 smaller than the number of the light sources of the light source part 1200 may be connected to the first and second balance PCBs 2103 and 2104 through a connector (not shown).

Therefore, the light sources of the light source part 1200 do not directly receive the driving electric power through corresponding wires (not shown), but receive electric currents substantially equally distributed in parallel by the first and second transformer balance circuits 2142 and 2144.

In addition, the first and second balance PCBs 2103 and 2104 may be mounted in a vacant space of the side support 1301, and the side support 1301 including the first and second balance PCBs 2103 and 2104 may be mounted in the bottom cover 1500, so that a reduced space of the LCD apparatus may be effectively utilized to make the LCD apparatus slimmer.

Figure 9:
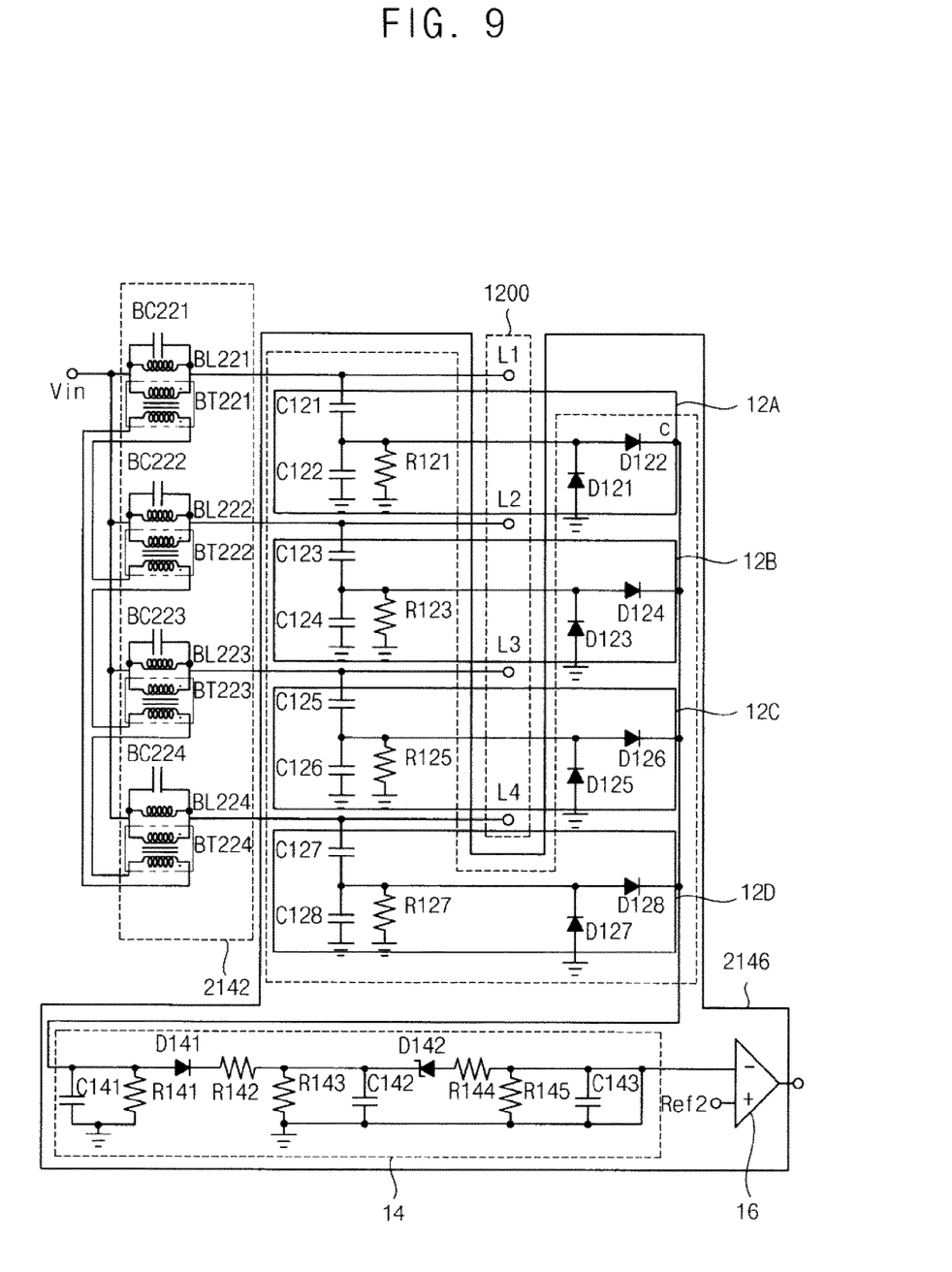
FIG. 9 is a circuit diagram illustrating a light source and a protection part of a backlight unit as illustrated in FIG. 8 according to an embodiment.

FIG. 9 is a circuit diagram illustrating a light source and a protection part of a backlight unit as illustrated in FIG. 8 according to an embodiment.

A light source and a protection part according to Embodiment 2 is substantially the same as the light source and the protection part in the embodiment of FIG. 5. Thus, the same reference numbers are used for the same elements, and repetitive descriptions are omitted.

Referring to FIGS. 7 to 9, a backlight unit 2000 included in the LCD apparatus according to Embodiment 2 of the present invention includes a light source driving apparatus 2100 and the light source part 1200.

The light source driving apparatus 2100 includes a power part 1120 and a protection part 2140.

The protection part 2140 includes a first transformer balance circuit 2142, a second transformer balance circuit 2144, the protection circuit 2146 and the protection circuit control part 2148.

A pulse width modulated signal as the input voltage corresponding to the predetermined interval may be higher than that corresponding to an interval in which the light sources are turned on. In this case, the protection circuit 2146 according to Embodiment 1 may stop the operation of the protection circuit control part 2148 during the predetermined interval.

The backlight unit in Embodiment 2 may be substantially the same as the backlight unit described with reference to the embodiment of FIG. 2 except that the protection part 2140 includes the first transformer balance circuit 2142 and the second transformer balance circuit 2144 instead of the first capacitor balance circuit 1142 and the second capacitor balance circuit 1144. Therefore, the same reference numbers are used for the same or similar elements, and any further descriptions concerning the same or similar elements will be omitted.

Referring back to FIGS. 7 to 9, the first transformer balance circuit 2142 includes first, second, third and fourth balance capacitors BC221, BC222, BC223 and BC224, first, second, third and fourth balance inductors BL221, BL222, BL223 and BL224, and first, second, third and fourth balance transformers BT221, BT222, BT223 and BT224. The number of the balance capacitors, balance inductors and the balance transformers may be determined to correspond to the number of the light sources of the light source part 1200.

The first to fourth balance capacitors BC121, BC122, BC123 and BC124, the first, second, third and fourth balance inductors BL221, BL222, BL223 and BL224, and the first, second, third and fourth balance transformers BT221, BT222, BT223 and BT224 may be mounted on the first balance PCB 2103.

The first, second, third and fourth balance transformers BT221, BT222, BT223 and BT224 may be connected to the first electrodes of the first to fourth light sources L1, L2, L3 and L4. The first, second, third and fourth balance transformers BT221, BT222, BT223 and BT224 control the load properties of the first to fourth light sources L1, L2, L3 and L4 to avoid being changed by circumstances such as temperature, and maintain a current balance so that uniform currents may flow through the first to fourth light sources L1, L2, L3 and L4. The first, second, third and fourth balance transformers BT221, BT222, BT223 and BT224 may be disposed between the power part 1120 and the first to fourth light sources L1, L2, L3 and L4.

The first to fourth balance capacitors BC121, BC122, BC123 and BC124, and the first, second, third and fourth balance inductors BL221, BL222, BL223 and BL224 are connected to primary terminals of the first, second, third and fourth balance transformers BT221, BT222, BT223 and BT224, respectively, and form a closed loop. Accordingly, a counterbalance and compensation voltage with respect to the electric current in the closed loop is generated according to an impedance deviation of the first to fourth light sources L1, L2, L3 and L4, to uniformly maintain a current balance.

Furthermore, a tertiary coil structure, which is formed by the first, second, third and fourth balance inductors BL221, BL222, BL223 and BL224, and the first, second, third and fourth balance transformers BT221, BT222, BT223 and BT224, may allow the protection part 2140 to be easily designed, and may increase the safety of the backlight unit.

The protection circuit 2146 is disposed between the first transformer balance circuit 2142 and the first to fourth light sources L1, L2, L3 and L4, but the protection circuit 2146 may be disposed between the second transformer balance circuit 2144 and the first to fourth light sources L1, L2, L3 and L4.

The circuit structure of the second transformer balance circuit 2144 may be substantially the same as that of the first transformer balance circuit 2142 except that the balance transformers corresponding to the first, second, third and fourth balance transformers BT221, BT222, BT223 and BT224 of the first transformer balance circuit 2142 are connected to the second electrodes of the first to fourth light sources L1, L2, L3 and L4.

In accordance with Embodiment 2, a waveform diagram illustrating a relationship between an input voltage provided to the light source in FIG. 7 and a holding signal is substantially the same as the waveform in FIG. 3. Thus, the same reference numbers are used for the same elements, and repetitive descriptions are omitted.

In accordance with Embodiment 2, a circuit diagram illustrating a protection circuit control part in a backlight unit in FIG. 7 is substantially the same as the protection circuit control part in FIG. 4. Thus, the same reference numbers are used for the same elements, and repetitive descriptions are omitted.

In accordance with Embodiment 2, a flowchart illustrating a method of driving the light source in FIG. 7 is substantially the same as the flowchart in FIG. 6. Thus, the same reference numbers are used for the same elements, and repetitive descriptions are omitted.

According to Embodiment 2, a tertiary coil structure, which is formed by the first, second, third and fourth balance inductors BL221, BL222, BL223 and BL224, and the first, second, third and fourth balance transformers BT221, BT222, BT223 and BT224, may allow the protection part 2140 to be easily designed, and may increase the safety of the backlight unit.

As described above, according to one or more embodiments of the present invention, a protection circuit blocking a current applied to a light source may be shut down during a predetermined interval, even though a voltage corresponding to the predetermined interval is higher than a voltage corresponding to an interval in which light sources are turned on. Thus, the operation of the protection circuit may be prevented when the light source is not faulty. Therefore, the reliability of an LCD apparatus including the protection circuit may be enhanced.

The foregoing is illustrative of one or more embodiments of the present invention and is not to be construed as limiting thereof. Although a few example embodiments of the present invention have been described, those skilled in the art will readily appreciate that many modifications are possible in the example embodiments without materially departing from the novel teachings and advantages of the embodiments of the present invention. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. The present disclosure is defined by the following claims, with equivalents of the claims to be included therein.

What is claimed is:

1. A driving apparatus for driving a light source comprising:
   an inverter configured to provide the light source with an input voltage from a first time to a second time;
   a protection circuit configured to shut down the inverter based on an overvoltage protection level that is detected based on the input voltage; and
   a protection circuit control part configured to prevent the protection circuit from shutting down the inverter during a predetermined interval extending from the first time to a third time prior to the second time,
   wherein the protection circuit control part includes a holding part configured to generate a holding signal during the predetermined interval corresponding to an initial stage for turning on the light source, the holding part comprises:
   a first switching element having a first conductivity type, an input terminal, an output terminal and a control terminal of the first switching element being connected to a power voltage via a first resistor, a ground and an input terminal, respectively,
   a second switching element having the first conductivity type, an input terminal, an output terminal and a control terminal of the second switching element being connected to the power voltage, the ground and the input terminal of the first switching element, respectively,
   a third switching element having a second conductivity type, an input terminal, an output terminal and a control terminal of the third switching element being connected to an input of a comparator, the ground and the input terminal of the second switching element via a capacitor, respectively, and
   a second resistor connected between the control terminal and the output terminal of the third switching element.

2. The driving apparatus of claim 1, further comprising:
   a printed circuit board (PCB); and
   a pattern capacitor defined by patterns formed on an upper surface and a lower surface of the PCB, wherein the protection circuit detects the overvoltage protection level by using the pattern capacitor and provides the protection circuit control part with the detected overvoltage protection level.

3. The driving apparatus of claim 2, wherein the protection circuit is formed on the PCB.

4. The driving apparatus of claim 2, wherein the PCB further comprises a plurality of balance capacitors restricting the input voltage provided from the inverter to each of the light sources to uniformly maintain a balance of electric currents applied to the light sources.

5. The driving apparatus of claim 1, wherein the input voltage is a pulse width modulation voltage.

6. The driving apparatus of claim 1, wherein the protection circuit control part further includes a comparing part comparing the holding signal with the first reference level to generate a protection circuit control signal having a low level during the predetermined interval and a high level except during the predetermined interval.

7. The driving apparatus of claim 6, wherein the protection circuit operates based on the protection circuit control signal.

8. The driving apparatus of claim 1, wherein the PCB further comprises a plurality of balance inductors restricting the input voltage provided from the inverter to each of the light sources to uniformly maintain a balance of electric currents applied to the light sources.

9. A liquid crystal display (LCD) apparatus comprising:
   an LCD panel;
   a light source providing the LCD panel with light; and
   a driving apparatus driving the light source, the driving apparatus comprising:
   an inverter configured to provide the light source with an input voltage from a first time to a second time;

a protection circuit configured to shut down the inverter based on an overvoltage protection level that is detected based on the input voltage; and a protection circuit control part configured to prevent the protection circuit from shutting down the inverter during a predetermined interval extending from the first time to a third time prior to the second time, wherein the protection circuit control part includes a holding part configured to generate a holding signal during the predetermined interval corresponding to an initial stage for turning on the light source, the holding part comprises:

a first switching element having a first conductivity type, an input terminal, an output terminal and a control terminal of the first switching element being connected to a power voltage via a first resistor, a ground and an input voltage, respectively, a second switching element having the first conductivity type, an input terminal, an output terminal and a control terminal of the second switching element being connected to the power voltage, the ground and the input terminal of the first switching element, respectively, a third switching element having a second conductivity type, an input terminal, an output terminal and a control terminal of the third switching element being connected to an input of a comparator, the ground and the input terminal of the second switching element via a capacitor, respectively, and a second resistor connected between the control terminal and the output terminal of the third switching element.

10. The LCD apparatus of claim 9, wherein the protection circuit control part further includes a comparing part comparing the holding signal with a first reference level to generate a protection circuit control signal having a low level during the predetermined interval and a high level except during the predetermined interval.

11. The LCD apparatus of claim 9, wherein the PCB further comprises a plurality of balance inductors restricting the input voltage provided from the inverter to each of the light sources to uniformly maintain a balance of electric currents applied to the light sources.

12. The LCD apparatus of claim 9, further comprising a feedback circuit part generating a feedback signal which controls a voltage level of the input voltage in accordance with whether the light source is normally turned on.

13. The LCD apparatus of claim 9, wherein the protection circuit shuts down the inverter when the overvoltage protection level is higher than a second reference level.

14. The LCD apparatus of claim 9, wherein the light source comprises one of a plurality of light-emitting diodes (LEDs) and at least one cold cathode fluorescent lamp (CCFL).

* * * * *